United States Patent [19]

Buscaiolo et al.

[11] Patent Number: 4,747,457
[45] Date of Patent: May 31, 1988

[54] PLATFORM TRUCK FOR TRANSPORTING BULKY LOADS

[75] Inventors: Gianfranco Buscaiolo; Mario Buscaiolo, both of Villanova Monferrato, Italy

[73] Assignee: FRAMAB S.n.c., Villanova Monferrato, Italy

[21] Appl. No.: 935,507

[22] Filed: Nov. 26, 1986

[51] Int. Cl.⁴ .................. B62D 51/04; B62D 51/00
[52] U.S. Cl. ............................ 180/19.1; 180/9.22; 180/9.3; 280/5.22
[58] Field of Search .............. 280/28.5, 5.22, 5.28, 280/5.24, 5.3; 180/19.1, 19.2, 19.3, 9.22, 9.21, 9.3, 9.42, 8.1, 904

[56] References Cited

U.S. PATENT DOCUMENTS

| 3,215,446 | 11/1965 | Thackrey | 280/5.28 |
| 3,269,475 | 8/1966 | Voelker | 180/19.1 X |
| 4,027,889 | 6/1977 | Krofchalk et al. | 180/9.22 |
| 4,033,421 | 7/1977 | Ikarimoto | 180/9.22 |
| 4,062,418 | 12/1977 | Misawa | 280/5.22 X |
| 4,645,022 | 2/1987 | Bergquist | 180/19.3 |

FOREIGN PATENT DOCUMENTS

| 808411 | 7/1951 | Fed. Rep. of Germany | 280/5.22 |
| 500846 | 11/1954 | Italy | 280/5.22 |

Primary Examiner—James T. McCall
Attorney, Agent, or Firm—Jeffers, Hoffman & Niewyk

[57] ABSTRACT

A truck for transporting bulky loads, the truck having a frame provided with lateral crawler tracks and an upper load carrying platform movable in relation to the frame; a trolley assembly being connected to the frame for movement relative thereto to lift the tracks off the ground.

6 Claims, 5 Drawing Sheets

PLATFORM TRUCK FOR TRANSPORTING BULKY LOADS

BACKGROUND OF THE INVENTION

The present invention relates to a platform truck for transporting bulky, heavyweight loads particularly sensitive to impact or jolting, e.g. pianos, computers, photocopy machines and such like.

SUMMARY OF THE INVENTION

It is an object of the present invention to provide a truck of the aforementioned type so designated to enable accurate maneuvering up and down stairs and along landings, corridors and similar structures.

It is a further object of the present invention to provide a truck enabling easy maneuvering of the truck itself and of its load in confined spaces, e.g. around landings joining two adjacent flights of stairs.

It is a still further object of the present invention to provide a truck allowing for easy control of the stability of the load and truck assembly and for easy change of the overall shape of such assembly to improve cornering capability.

According to the present invention there is provided a truck comprising a frame, a load supporting upper platform connected in a movable manner to said frame, first drive means carried by said frame to move said platform relative to said frame, and first and second means of advancement connected to said frame to advance the same along a predetermined path; said first means of advancement comprising a pair of lateral crawler tracks and second drive means carried by said frame to move said tracks independently of one another, said second drive means being reversible; and said second advancement means comprising a trolley assembly connected to said frame in a movable manner; third drive means being provided to move said trolley assembly in relation to said frame between an upper rest position above a run of said tracks, and a lower operative position below said lower run.

BRIEF DESCRIPTION OF THE DRAWINGS

The invention will now be described by way of example with reference to the accompanying drawings, in which.

DETAILED DESCRIPTION OF THE INVENTION

Figure 1:
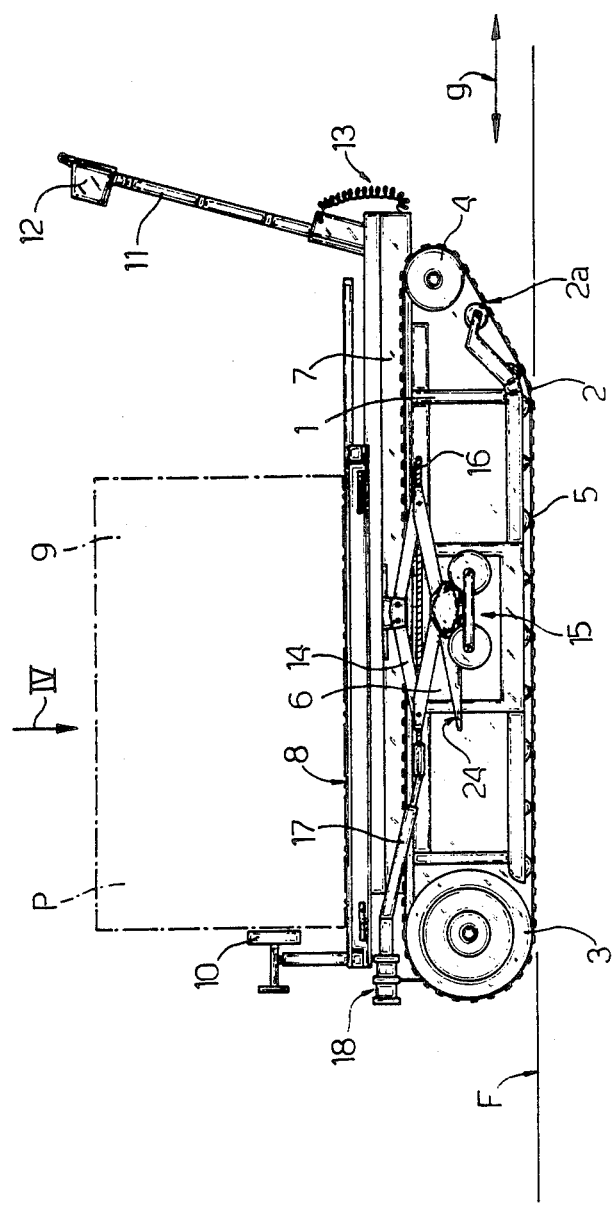
FIG. 1 is a side view of a truck in accordance with the present invention in a first operational configuration.
Figure 2:
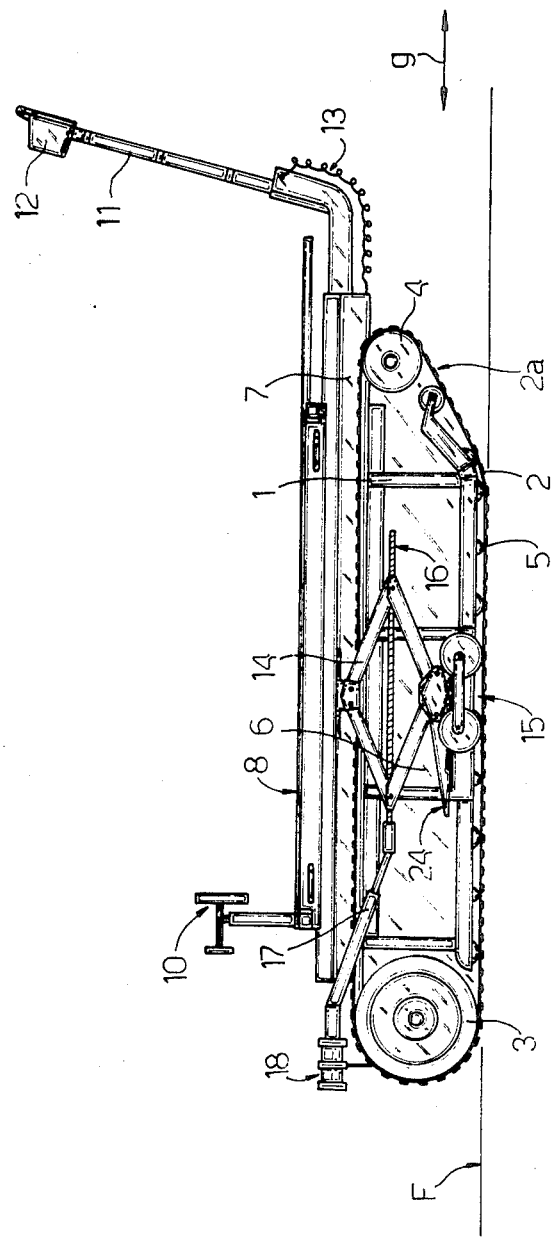
FIG. 2 is a lateral view of the truck of FIG. 1 in a second operational position.
Figure 3:
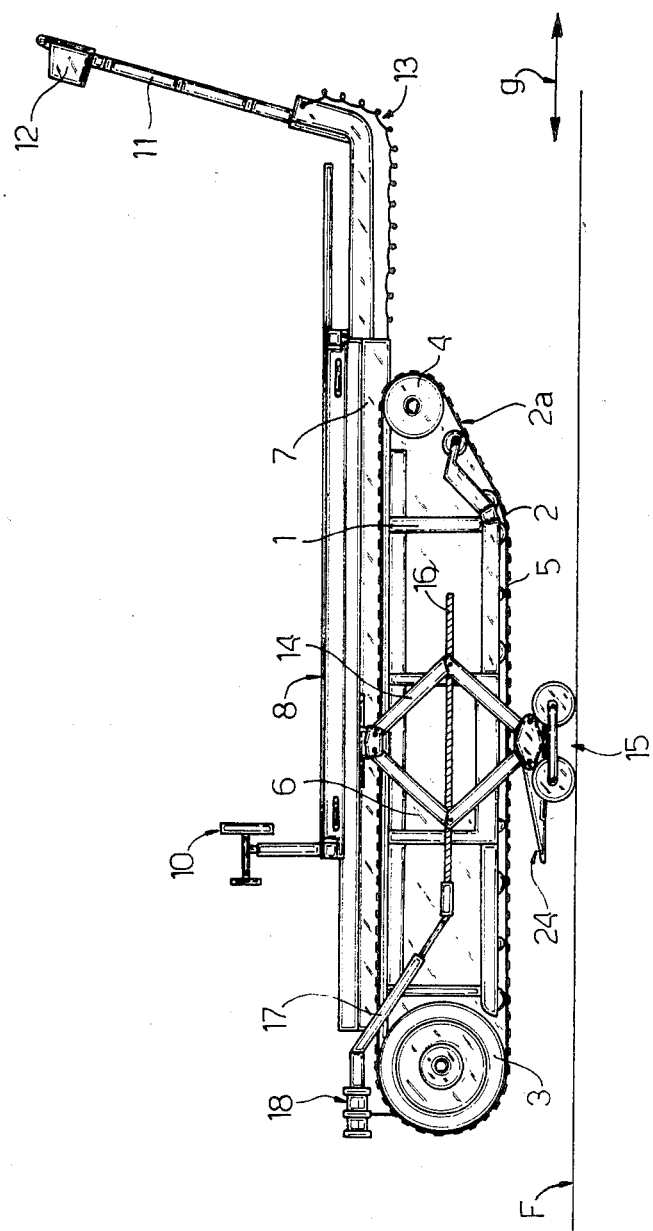
FIG. 3 is a lateral view of the truck of FIG. 1 in a further operational position.

FIGS. 1 to 3 show a truck including a frame 1, on each lateral side of which a track 2 is provided, which is looped about a respective drive wheel 3 and a transmission wheel 4. Each track 2 comprises a lower run, which extends in contact with a number of guide rollers 5 mounted on frame 1, and rests on floor F. Through illustrated flat in the attached drawings, floor F will obviously be on a slant in the case of stairs, ramps or similar.

Batteries 6, preferably of the rechargeable type, are housed in frame 1 for powering the various motors of the truck.

Along each of its lateral sides, frame 1 is provided with an upper guide rail 7 for a platform 8 designed to slide back and forth along rails 7 in a direction parallel with tracks 2 as indicated by a arrow g.

Platform 8, as shown in FIG. 1, receives load 9 indicated schematically by a dot and dash line. Load 9, e.g. a piano, computer or photocopy machine, rests against a vertically adjustable shoulder 10 integral with platform 8.

Platform 8 is also connected, for movement therewith, to a rudder or handlebar type arm 11 terminating at the top end in a casing 12 housing control means connected to the various drive motors on the truck by means of electric wires 13.

On each side of frame 1, a support is provided which houses a lever mechanism 14 in the form of an articulated parallelogram connected in articulated manner at the top to frame 1 and, at the bottom, to a respective trolley 15 provided with a pair of rollers. At the articulated connecting points of the arms on the parallelogram, the said arms cooperate with a threaded shaft 16 connected by means of a cardan shaft 17 to a transmission of geared motor 18. The said geared motors 18 are driven, via further drive shafts (not shown), by a controllable electric motor 40 of the reversible type indicated schematically in FIG. 4. Provision is also made, underneath platform 8, for a further reversible electric motor 20 which, via a further screw 21 or cable or chain mechanisms, drives platform 8 in the direction indicated by arrow g. Both motors 20 and 40 are controlled by push-button 22 on control unit 12.

Figure 4:
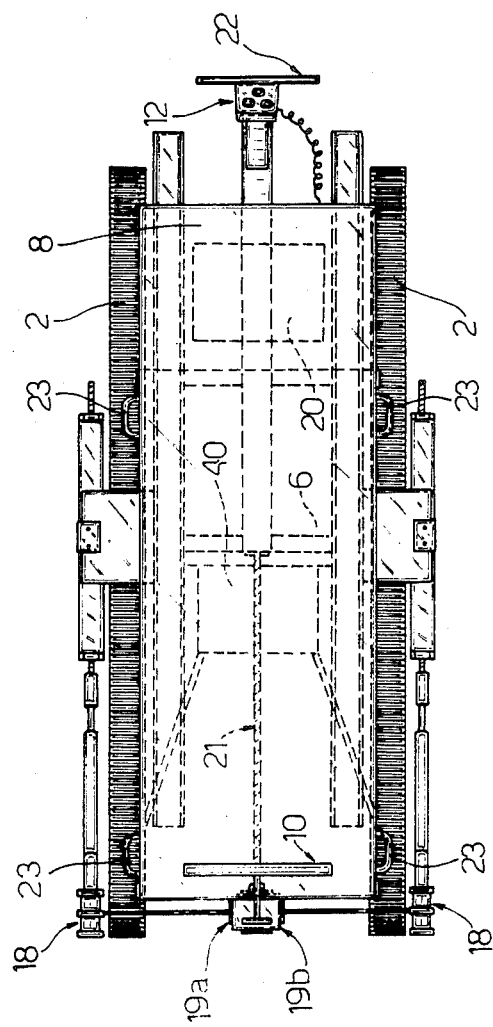
FIG. 4 is a top view of the truck of FIG. 1 in the direction of arrow IV of FIG. 1.

As shown in FIG. 4, platform 8 is also fitted with lateral emergency grip or cable tie members 23.

For driving tracks 2, wheels 3 are connected to respective controllable geared reversible electric motors 19a–19b, which drive tracks 2 according to the control signals received from unit 12 on arm 11.

The truck according to the present invention operates as follows.

When tracks 2 are powered by geared motors 19a and 19b controlled by unit 12 on the end of arm 11, the truck is moved by tracks 2 forward or backward in the direction shown by arrow g.

As shown in FIGS. 1, 2 and 3, when a landing is reached, for example, operation of wheels 3 and, consequently also, tracks 2 is cut off by operating controls transmitted by unit 12 on arm 11 and wires 13.

Subsequent to a further operating control, geared motors 18 are activated by controllable motor 40, and, together with cardan shafts 17, screws 16 are activated in such a manner as to move the trolley assembly consisting in the two trolleys 15 from an upper rest position shown in FIG. 1 down onto floor F (FIG. 2), and then to a lower operative position shown in FIG. 3 where the above trolley assembly supports the entire frame 1, together with tracks 2 and load 9, off floor F.

Each trolley 15 is provided, in a position adjacent to its rollers, with a laterally-projecting plate 24 which acts as a safety supporting means.

When frame 1, together with load 9, is lifted off floor F, as shown in FIG. 3, tracks 2 are also raised off the floor and the entire load bears down on trolleys 15. The rollers of each trolley 15 are set close together so as to enable rotation about a vertical axis and displacement of frame 1, for maneuvering platform 8, for example, onto the next flight of stairs.

If the center of gravity of load 9 is not arranged between trolleys 15 or if, for reasons of size, load 9 needs shifting in relation to frame 1, screw 21 (FIG. 4) may be activated for shifting platform 8, together with arm 11, in relation to frame 1, thus enabling any necessary adjustments to be made.

When load 9, together with frame 1, is suitably positioned for negotiating the next flight of stairs, transmissions or geared motors 18 are reverse operated for restoring trolleys 15 from the FIG. 3 position to the idle position shown in FIG. 1, and, at the same time, setting tracks 2 back onto floor F with the inclined or wedge-shaped portion 2a of each track 2 resting on the bottom stairs of the next flight to be climbed.

Subsequent operation of motors 19a and 19b connected to drive wheels 3 on tracks 2 causes the truck to commence climbing the ramp or stairs being negotiated.

As shown in FIGS. 1 to 4, load 9 rests against vertically adjustable stop shoulder 10 as the truck moves up the stairs or ramp.

Load 9 is obviously also secured firmly to platform 8 in the ordinary manner using cables and chains.

Handlebar arm 11 and control unit 12 also accompany platform 8 when it is moved back and forth in the direction shown by arrow g. The advantage of this feature is that it enables the operator, who grips the truck by end 11a of arm 11, to maintain direct operating control of the truck, in addition to efficiently controlling the aforementioned drive motors.

Batteries 6 powering the above motors are located between tracks 2 and maintained in the center of the truck at all times. To prevent any unnecessary increase in the weight of the truck, all the construction components are preferably made of lightweight alloy and thin-walled tubular elements.

Figure 5:
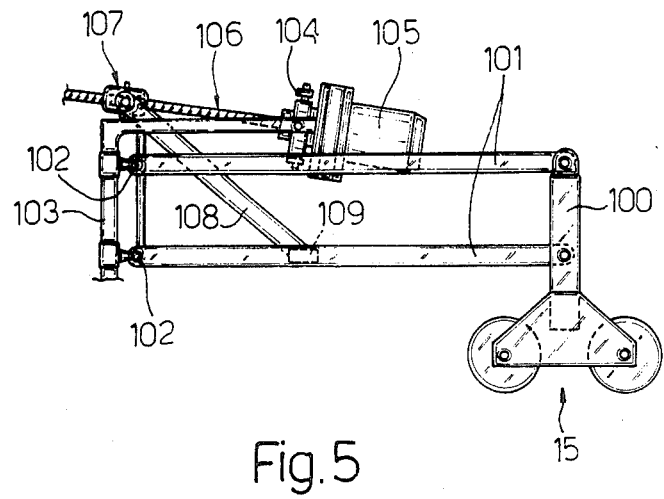
FIGS. 5 and 6 are side views of a variant of a detail of the truck of FIG. 1 in two different operational positions.
Figure 6:
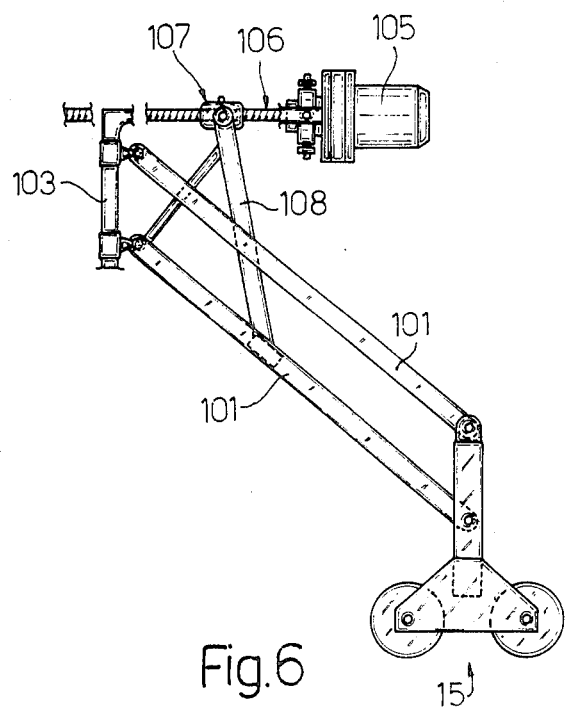

FIGS. 5 and 6 show a further embodiment of the mechanism wherein both activating trolleys 15 consist of a support 100 connected in articulate manner to two levers 101, in turn, connected in artuclated manner, at points 102, to truck frame 103. By means of a cardan mechanism 104, frame 103 also supports a drive motor 105 powering a threaded shaft 106 housed inside a threaded coupling 107 connected in articulated manner to a crosspiece 108, in turn, connected in articulated manner, at point 109, to bottom lever 101.

Support 104 and threaded coupling 107, also of cardanic structure, provide for inclining threaded shaft 106 and motor 105 in relation to the horizontal plane.

Operation of the FIG. 5 mechanism is shown in more detail in FIG. 6.

Operation of shaft 105 causes shaft 106 to rotate and threaded coupling 107 to move towards shaft 105. Such displacement, via crosspiece 108, pushes down the two parallel arms 101, thus causing trolley 15 to move down onto the floor and so raise the truck by means of frame 103.

The mechanism shown in FIGS. 5 and 6 has the advantage of being less complex and more compact than the one in FIGS. 1 to 4.

We claim:

1. A truck comprising a frame, a load supporting upper platform connected in a movable manner to said frame, first drive means carried by said frame to move said platform relative to said frame, and first and second means of advancement connected to said frame to advance said frame along a predetermined path; said first means of advancement comprising a pair of lateral crawler tracks and second drive means carried by said frame to move said tracks independently of one another, said second drive means being reversible; and said second advancement means connected substantially at the center of the longitudinal axis of said frame comprising a trolley assembly connected to said frame in a movable manner; third drive means being provided to move said trolley assembly in relation to said frame between an upper rest position above a run of said tracks, and a lower operative position below said lower run whereby said frame and load are completely supported by said trolley assembly.

2. A truck as claimed in claim 1, wherein each said first, second, and third drive means comprise electric motors, batteries being carried by said frame to activate said motors.

3. A truck as claimed in claim 1, wherein guide rails are provided on opposite sides of said frame; said guide rails extending in a direction parallel with said tracks, and said platform being coupled to said guide rails to slide therealong.

4. A truck as claimed in claim 1, wherein an adjustable stop means for said load is connected to said platform.

5. A truck as claimed in claim 1, wherein handlebar type arm is articulated to said platform and movable therewith in relation to said frame, hand operable control means for said first, second and third drive means being provided on said rudder.

6. A truck as claimed in claim 1, wherein said trolley assembly comprises two trolleys arranged on opposite sides of said frame; each said trolley including a lever mechanism in the form of an articulated parallelogram, said trolley being hinged to a bottom end of said articulated parallelogram; said mechanism comprising two pairs of opposite hinges, and said third drive means comprising means for varying the distance between the hinges of each said pair of opposite hinges.

* * * * *